United States Patent [19]

Crawford

[11] Patent Number: 5,096,361

[45] Date of Patent: Mar. 17, 1992

[54] DEVICE FOR LOADING A FOLDED WHEELCHAIR INSIDE A MOTOR VEHICLE

[76] Inventor: Jane J. Crawford, 2070 W. Boulder Ct., Chandler, Ariz. 85248

[21] Appl. No.: 641,066

[22] Filed: Jan. 14, 1991

[51] Int. Cl.⁵ ............................................... B60P 3/06
[52] U.S. Cl. ...................... 414/462; 414/549; 414/917; 414/921; 414/786
[58] Field of Search ............... 414/462, 547, 549, 544, 414/541, 542, 917, 921, 495, 786; 212/258, 259; 182/82, 88, 141; 254/387

[56] References Cited

U.S. PATENT DOCUMENTS

| | | | |
|---|---|---|---|
| 2,953,287 | 9/1960 | Werner | 414/462 X |
| 3,912,048 | 10/1975 | Manning | 414/541 |
| 4,299,527 | 11/1981 | Pobocik | 414/462 |
| 4,354,791 | 10/1982 | Antonellis | 414/921 X |
| 4,544,321 | 10/1985 | Lanier | 414/542 |
| 4,671,730 | 6/1987 | Gateau | 414/549 X |
| 4,685,860 | 8/1987 | McFarland | 414/462 X |
| 4,725,183 | 2/1988 | Smillie | 414/462 X |
| 4,753,567 | 6/1988 | Achee | 414/462 |
| 4,958,979 | 9/1990 | Svensson | 414/921 X |

Primary Examiner—Frank E. Werner
Assistant Examiner—Brian Dinicola
Attorney, Agent, or Firm—Antonio R. Durando; Harry M. Weiss

[57] ABSTRACT

A device for loading and unloading a wheelchair into and out of a motor vehicle, consisting of a horizontal carriage track mounted transversely on the floor of the vehicle and extending the length of the compartment behind the front seat. A carriage block is slideably engaged with the carriage track and connected to a motor-actuated screw drive that causes it to slide along the track on command. An arm with a wheel-support track assembly conforming to the front wheels of a standard wheelchair is pivotally attached to the carriage block and can be extended to the outside of the vehicle to receive the folded wheelchair and move it in and out of the vehicle as the arm is retracted or extended as a result of the carriage block sliding across the track. The device is controlled by a single switch operable from the driver's seat.

12 Claims, 1 Drawing Sheet

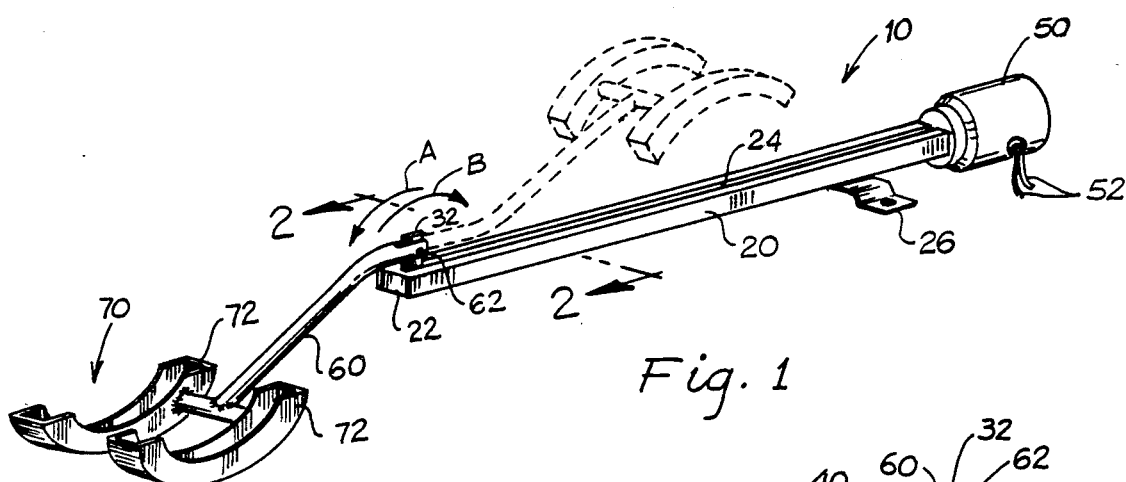
Fig. 1
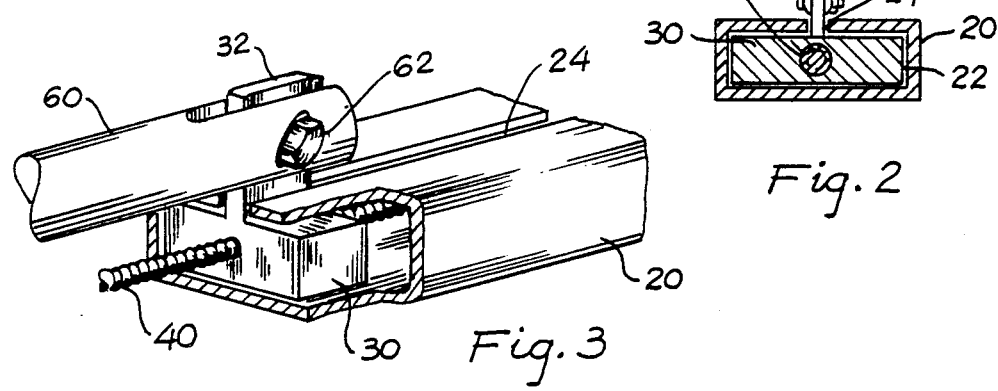
Fig. 2
Fig. 3
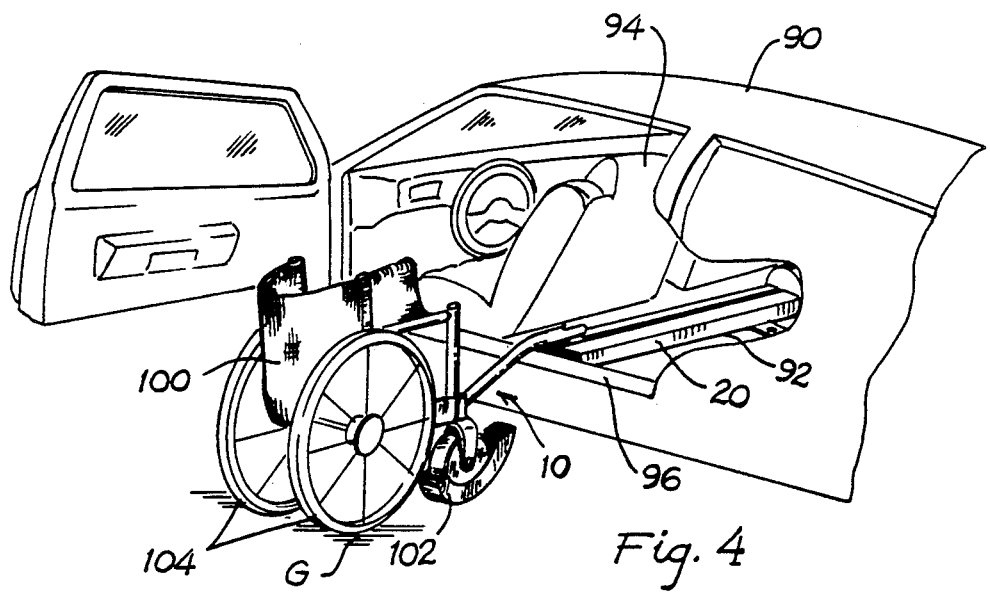
Fig. 4

DEVICE FOR LOADING A FOLDED WHEELCHAIR INSIDE A MOTOR VEHICLE

BACKGROUND OF THE INVENTION

1. Field of the Invention

This invention pertains to the general field of wheelchair lifting equipment and, in particular, to a new and improved apparatus for loading a collapsed wheelchair behind the driver's seat of a motor vehicle.

2. Description of the Prior Art

The ability to drive is indispensable for a normal and independent life in our society. Therefore, people confined to a wheelchair by disability usually continue to operate motor vehicles in spite of the obvious obstacles resulting from their limited mobility. A difficult problem encountered by them arises in the process of transferring from the wheelchair to the driver's seat of the vehicle, and then in loading the wheelchair on the vehicle for transportation.

Various devices have been developed in recent years to facilitate access to vehicles and to permit the easy stowing of the wheelchair. Specially equipped vans, for instance, feature elevator platforms that enable a user to enter the cargo portion of the van from the side door while still occupying the wheelchair, thus rendering the front seat more accessible from the inside of the vehicle. Other vans are equipped with extendable ramps that allow the wheelchair occupant to enter the back portion of the vehicle directly. When these types of vehicles are chosen, of course, there is no problem involved with the loading or stowing of the wheelchair because it is already inside the vehicle when its occupant transfers to the driver's seat, but the problem remains in the case of automobiles and other motor vehicles that have to be entered directly from the driver's front door.

Typically, the user of the wheelchair has to grab it and store it somewhere in the vehicle. Special brackets have been developed for fastening a collapsed wheelchair to the back bumper of a car, but this procedure requires either the help of another person or the ability to walk from the back of the car to the driver's seat after securing the wheelchair in place. When this is not possible, the disabled person normally gains access to the vehicle by shifting the weight of his or her body from the wheelchair to the driver's seat while the chair is trapped between the seat and the open door. Then, it is common practice to reach for the wheelchair from the driver's seat and maneuver it inside the car in the space between the front and back seats. This practice requires considerable effort and strength, and it results in having to assume cumbersome positions that no one could sustain without difficulty. The purpose of this invention is to alleviate the physical stress and hardship endured by disabled people during this step in the process of gaining access to the vehicle.

A related invention is described in Pobocik et al. U.S. Pat. No. 4,299,527 (1981). It teaches a device for loading and unloading a wheelchair into and out of an automobile after the person using it has transferred from the wheelchair to the driver's seat of the car. After so transferring, the wheelchair is left empty outside the car but within reach from the driver's position. This invention provides an apparatus that grabs the empty chair under the flexible seat and lifts it, thus causing it to fold closed, and then pulls it inside the car in the space behind the front seat.

The device consists of a track mounted on the floor of the car in front of the back seat and a motor driven carriage capable of sliding from one end of the track to the other. Attached to this carriage, a special mechanism is provided with a motor driven system of levers and a bracket for reaching under the seat of the wheelchair and lifting it to a position high enough to clear the vehicle's door step. Then, the carriage is retracted along the track, thus pulling the wheelchair into the interior of the car. The actuating controls are conveniently placed in front within reach of the driver's position.

The main problem with the apparatus disclosed by Pobocik et al. is that it involves a complicated structure that is bulky and expensive to manufacture, resulting in an impractical and possibly uneconomical device for the purposes intended. After its installation on the floor of the automobile, the back seat becomes practically unusable because most of the leg space is occupied by the device's frame, whether or not a wheelchair is present. In addition, the presence of two motors adds to the space requirements and the two-step action of its mechanism necessitates the use of a double control feature. Because of the two separate movements required to load and unload a wheelchair, the device is slow and may lead to inadvertent misuse as a result of confusion on the part of the operator.

Thus, there still exists a need for a simpler, more economical, and more practical driver-controlled device for loading and unloading a wheelchair into and out of a motor vehicle. It is the purpose of this invention to address these objectives.

BRIEF SUMMARY OF THE INVENTION

One objective of this invention is a motor-vehicle wheelchair loading and unloading device that does not require the attachment of any hardware to the exterior of the vehicle.

Another goal is the development of an apparatus that is simple in construction and suitable for efficient installation between the front and back seats on the floor of the vehicle.

Another objective of the invention is that it be sufficiently compact not to interfere with the normal use of the back seat of the vehicle.

A further objective is a device that can be operated from the driver's seat of the vehicle through a single control switch and that features a one-step action for simplicity and speed of operation.

Yet another goal of the invention is its easy installation and removal, so that it can be promptly transferred between vehicles.

Finally, an objective of this invention is the realization of the above mentioned goals in an economical and commercially viable manner. This is done by utilizing simple components that are either already available in the open market or can be produced at competitive prices.

In accordance with these and other objectives, the device of this invention consists of a horizontal carriage track mounted transversely on the floor of a motor vehicle and extending the length of the compartment behind the front seat. A carriage block is slideably engaged with the carriage track and connected to a motor-actuated screw drive that causes it to slide along the track on command. An arm with a wheel support track assembly conforming to the front wheels of a wheelchair is pivotally attached to the carriage block and can be extended to the outside of the vehicle to receive the folded wheelchair and move it in and out of the vehicle as the arm is retracted or extended as a result of the carriage block sliding across the track. The device is controlled by a single switch operable from the driver's seat.

Various other purposes and advantages of this invention will become clear from its description in the specifications that follow and from the novel features particularly pointed out in the appended claims. Therefore, to the accomplishment of the objectives described above, this invention consists of the features hereinafter illustrated in the drawings and examples, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 1 is a free-standing perspective view of the preferred embodiment of this invention showing the relative movement of its main components.

FIG. 2 is an enlarged cross-sectional view of the carriage track of the invention taken from line 2—2 in FIG. 1.

FIG. 3 is a cut-out view of the carriage track of the invention showing the carriage block and the screw-drive mechanism used in the embodiment of FIG. 1.

FIG. 4 is a perspective view of the invention in use illustrating a folded wheelchair in the process of being pulled into the back compartment of an automobile.

DETAILED DESCRIPTION OF THE INVENTION

This invention consists of a novel combination of structural components that results into a more compact and practical device than shown in prior art for loading and unloading a wheelchair into and out of a motor vehicle. All components are chosen with a view to minimizing the space occupied by the apparatus while maintaining its effectiveness in moving the wheelchair. Thus, this invention uses a carriage track concept similar to the one described by Pobocik et al., but it introduces a novel and more efficient mechanism to hold the wheelchair and carry it along the length of the track. Because of its low profile, the resulting apparatus occupies a limited space on the floor of the vehicle and allows the comfortable use of the back seat. Moreover, the movement of this invention is driven by only one motor, requiring a single-switch control that can be operated by a user sitting in the driver's seat.

Referring to FIG. 1, a perspective view of the wheelchair loading and unloading apparatus 10 according to the preferred embodiment of this invention is shown free-standing before installation in a motor vehicle. Also referring to FIGS. 2 and 3, the apparatus is shown to comprise a carriage track 20 containing a carriage block 30 slideably engaged in the channel formed along the cross-section of its structure. In the embodiment shown here the carriage track 20 features a substantially rectangular cross-section 22 with a longitudinal opening 24 along its top side, which permits a carriage post 32, integrally connected to the carriage block 30, to protrude upward from the enclosed carriage block and slide with it along the length of the track. Of course, the cross-section of the carriage track could assume any geometric shape that would permit a slidable engagement with a conforming carriage block within the purview of the invention. The carriage block 30 is moved along the carriage track 20 by a continuous screw drive 40 that is rotatably threaded into the center of the block and that, therefore, causes the block to slide in one direction or the other depending on the direction of rotation of the screw drive. The screw drive 40 is connected to and driven by a reversible electric motor 50 appropriately geared to produce the desired speed of longitudinal motion for the carriage block, according to gear reduction methods that would be obvious to one skilled in the art. The reversible motor is powered by the vehicle's battery through a set of connecting terminals 52 and is controlled by a three-position switch (not shown in the figures) located within reach of the occupant of the driver's seat. When the switch is pressed from an "off" to a "forward" position, the motor drives the carriage block in one direction along the carriage track; when the switch is pressed to a "reverse" position, the motor reverses its rotation and drives the carriage block in the opposite direction. The details of the control circuitry are not illustrated here because they constitute well known technology that would be obvious to those skilled in the art.

One end of an extension arm 60 is pivotally attached to the carriage post 32 by means of a pin 62, or other equivalent means, so that it can rotate approximately 180 degrees along arrows A and B in FIG. 1 between a completely extended operative position and a completely retracted rest position (shown in phantom line). The other end of the arm 60 is rigidly attached to a wheel-support track assembly 70, which comprises two rounded tracks 72 that conform to the shape and size of standard wheelchair front wheels. Each wheel-support track is sufficiently deep and long to be able to receive the corresponding wheelchair wheel and securely hold it in place by virtue of the downward force exerted by the wheelchair's weight, without any need for additional strapping or fastening of any kind. A track depth of the order of the thickness of the corresponding wheel's tire and a track length ranging between approximately one third and one half of the wheel's circumference have been found to be sufficient to provide the necessary support. The two tracks 72 of the assembly 70 are rigidly connected in parallel and are spaced apart by approximately the same distance separating the front wheels of a wheelchair in its folded position, so that the wheels can be easily fit into the tracks by simply lifting and rolling them in place.

The length and curvature of the extension arm 60 are designed to fit the particular vehicle for which the invention is intended. The arm must be sufficiently long to reach outside the vehicle in its extended position, so that the arm and the wheel-support track assembly rest on the exterior portion of vehicle's door frame while supporting a wheelchair. Accordingly, the curvature must account for the difference in elevation between the carriage track and the doorstep, and the length of the arm must allow for easy and comfortable reach from the driver's seat. As will become more apparent below from the description of the operation of the invention, the curvature of the extension arm should also be as uniform as practicable, in order to avoid sharp edges that might get caught in the surrounding structure. Finally, the arm must not be so long that it cannot freely swing to its retracted position and completely fit on top of the carriage track occupying a relatively small space, so as not to hinder the use of the back seat when a wheelchair is not stowed in the vehicle.

FIG. 4 illustrates the use of the invention in an automobile 90. The apparatus 10 is installed by fastening the bracket 26 to the floor 92 of the vehicle by means of bolts or equivalent fasteners to form a rigid anchor with the body of the vehicle. Although another bracket could be added at the other end of the carriage track (not shown in the figures), it was found that one bracket is sufficient to give the apparatus the necessary sturdiness and stability for the purposes intended within the context of the invention. Moreover, a single bracket simplifies the installation process and renders the device more easily transferrable from one vehicle to another.

When the apparatus of this invention is in use for loading a wheelchair 100 into an automobile, the extension arm 60 is pivoted outwardly from its position of rest inside the car. Since this would normally occur when the last use was to unload the wheelchair from the vehicle, the carriage block 30 would be at the end of the carriage track 20 and in proper position to reach outside the vehicle when swung around the post 32, as indicated by arrow A in FIG. 1. Note that at this point the disabled person is sitting in the driver's seat 94 after having moved out of the wheelchair, as explained above, and the chair 100 is standing empty next to him or her on the ground G. Then, the person must fold it closed, which can be easily done from the driver's seat, and generally direct the wheelchair toward the back seat, so that it remains standing with its front wheels 102 in the vicinity of the wheel-support track assembly 70 resting outside the doorstep at the end of the extended arm 60. The person then must reach and place the chair's front wheels into the tracks 72 of the assembly, as seen in FIG. 4. Finally, the motor is activated to cause the carriage block 30 to be drawn in by the screw drive 40, which in turn pulls the extension arm 60 and the track assembly 70 smoothly into the vehicle by sliding them over the doorstep 96. Because of the great stability that the large wheels 104 afford the wheelchair, the pulling action of the wheel-support track assembly 70 results in a steady and stable motion of the wheelchair itself into the back compartment of the vehicle. As the carriage block proceeds toward the opposite end of the carriage track 20, the track assembly 70 freely slides over it and the large wheels 104 follow by rolling over the doorstep 96 and on the floor 92 on both sides of the track 20. The motor is stopped by the user when the wheelchair is completely inside the vehicle by returning the switch to its "off" position. It is obvious from this description that the reverse operation would result in the unloading of the wheelchair 100 from the vehicle 90. Therefore, it is not described in detail here. Thus, this invention enables a disabled person to carry a wheelchair in a vehicle with a manageable level of effort that greatly enhances his or her ability to travel independently.

Various changes in the details, steps and materials that have been described may be made by those skilled in the art within the principles and scope of the invention herein illustrated and defined in the appended claims. For example, a system of limit switches could be incorporated in the design of the invention to automatically interrupt the motion of the carriage block when a predetermined point is reached in either direction. This feature would minimize the degree of attention required of the operator. In another embodiment of the invention, the bottom side of the extension arm and of the wheel-support track assembly could be coated with anti-friction material to facilitate their sliding motion over the vehicle's doorstep. Similarly, the inside of the wheel-support tracks could be lined with rubber or equivalent material to provide a stronger grip on the wheelchair wheels. The invention herein described is sized for the width and height of a standard automobile, but the same functional principles can be applied to vehicles of different dimensions, so long as practical for a disabled person to operate.

Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus and methods.

What I claim is:

1. An apparatus for loading and unloading a folded wheelchair into and out of a motor vehicle, comprising:
   (a) a horizontal elongated carriage track affixed transversely to the floor of said motor vehicle;
   (b) a carriage block slideably mounted in a longitudinal channel formed along the cross-section of said elongated carriage track;
   (c) an extension arm pivotally attached at one end to said carriage block and capable of rotating about said carriage block between a completely extended position and a completely retracted position, the other end of said extension arm being rigidly, attached to a wheel-support track assembly having wheel receiving means for receiving and securely holding in place the front wheels of said folded wheelchair when said extension arm is in said extended position; and
   (d) driving means for causing said carriage block to travel along said longitudinal channel of said elongated carriage track on command, thereby carrying said wheel support track assembly and said wheelchair securely held thereon in and out of said motor vehicle.

2. The apparatus defined in claim 1, wherein said driving means for causing said carriage block to travel along said longitudinal channel of said elongated carriage track on command comprises a continuous screw drive having an elongated threaded rod means extending parallel to said longitudinal channel and being rotatably threaded through the center of said carriage block, said continuous screw drive further including a reversible electric motor rotatably coupled to said elongated threaded rod means, whereby the direction in which said carriage slides along said longitudinal channel is determined by the direction of rotation of said reversible electric motor.

3. The apparatus defined in claim 1, wherein said elongated carriage track features a substantially rectangular cross-section with a longitudinal opening along its top side, wherein said carriage block also features substantially rectangular cross-section conforming with the cross-section of said elongated carriage track, wherein a carriage post is integrally connected to said carriage block and protrudes upward through said longitudinal opening along the top side of said elongated carriage track, and wherein said carriage post slides with said elongated carriage block along the length of said carriage track.

4. The apparatus defined in claim 3, wherein said extension arm is pivotally attached to said carriage post and can rotate approximately 180 degrees between said completely extended position and said completely retracted position, wherein said extension arm is sufficiently long and uniformly curved to account for a difference in elevation between said carriage track and a doorstep of said motor vehicle, so that it can reach outside the vehicle in said extended position.

5. The apparatus defined in claim 1, wherein said wheel receiving means comprises two rounded tracks that conform to circumferential characteristics of standard wheelchair front wheels, said two tracks being rigidly connected in parallel and spaced apart by approximately the same distance separating said standard wheelchair front wheels when the wheelchair is in its folded position, and said two tracks being sufficiently deep and long to be able to receive said front wheels and to securely hold them in place by virtue of the downward force exerted by the wheelchair's weight.

6. The apparatus defined in claim 5, wherein the depth of said two tracks is of the order of the thickness of the tires of said wheelchair front wheels and the length of said two tracks is approximately one half of the wheels' circumference.

7. A method for loading and unloading a folded wheelchair into and out of a motor vehicle, comprising the following steps:
   (a) affixing a horizontal elongated carriage track transversely to the floor of said motor vehicle;
   (b) providing a carriage block slideably mounted in a longitudinal channel formed along the cross-section of said elongated carriage track;
   (c) providing an extension arm pivotally attached at one end to said carriage block and capable of rotating about said carriage block between a completely extended position and a completely retracted position, the other end of said extension arm being rigidly attached to a wheel-support track assembly having wheel receiving means for receiving and securely holding in place the front wheels of said folded wheelchair when said extension arm is in said extended position;
   (d) providing driving means for causing said carriage block to travel along said longitudinal channel of said elongated carriage track on command, thereby carrying said wheel support track assembly and said wheelchair securely held thereon in and out of said motor vehicle;
   (e) pivoting said extension arm, for the purpose of loading said folded wheelchair into said motor vehicle, from a retracted position within said vehicle to a completely extended position to cause said wheel-support track assembly to rest on a doorstep outside the vehicle;
   (f) manually placing the front wheels of said folded wheelchair into said wheel-support track assembly;
   (g) actuating said means for causing said carriage block to travel along said carriage track so that said extension arm and said wheelchair are retracted inside the vehicle; and
   (h) reversing the procedure described in steps (e), (f) and (g) for the purpose of unloading said folded wheelchair from said motor vehicle.

8. The method defined in claim 7, wherein said driving means for causing said carriage block to travel along said longitudinal channel of said elongated carriage track on command comprises a continuous screw drive having an elongated threaded rod means extending parallel to said longitudinal channel and being rotatably threaded through the center of said carriage block, said continuous screw drive further including a reversible electric motor rotatably coupled to said elongated threaded rod means, whereby the direction in which said carriage slides along said longitudinal channel is determined by the direction of rotation of said reversible electric motor.

9. The method defined in claim 7, wherein said elongated carriage track features a substantially rectangular cross-section with a longitudinal opening along its top side, wherein said carriage block also features a substantially rectangular cross-section conforming with the cross-section of said elongated carriage track, wherein a carriage post is integrally connected to said carriage block and protrudes upward through said longitudinal opening along the top side of said elongated carriage track, and wherein said carriage post slides with said elongated carriage block along the length of said carriage track.

10. The method defined in claim 9, wherein said extension arm is pivotally attached to said carriage post and can rotate approximately 180 degrees between said completely extended position and said completely retracted position, wherein said extension arm is sufficiently long and uniformly curved to account for a difference in elevation between said carriage track and a doorstep of said motor vehicle, so that it can reach outside the vehicle in said extended position.

11. The method defined in claim 7, wherein said wheel receiving means comprises two rounded tracks that conform to circumferential characteristics of standard wheelchair front wheels, said two tracks being rigidly connected in parallel and spaced apart by approximately the same distance separating said standard wheelchair front wheels when the wheelchair is in its folded position, and said two tracks being sufficiently deep and long to be able to receive said front wheels and to securely hold them in place by virtue of the downward force exerted by the wheelchair's weight.

12. The method defined in claim 11, wherein the depth of said two tracks is of the order or the thickness of the tires of said wheelchair front wheels and the length of said two tracks is approximately one half of the wheels' circumference.

* * * * *